Patented Mar. 7, 1939

2,149,433

UNITED STATES PATENT OFFICE 2,149,433

ANTHRAQUINONE DERIVATIVES

Paul Grossmann, Binningen, near Basel, and Max Bommer, Riehen, near Basel, Switzerland, assignors to Society of Chemical Industry in Basle, Basel, Switzerland No Drawing. Application November 21, 1936, Serial No. 112,144. In Switzerland December 7, 1935

1 Claim. (Cl. 260—303)

This invention relates to the manufacture of valuable new anthraquinone derivatives by allowing compounds to react with aminoisothiazolanthrones which introduce such anthraquinone carboxylic acid radicals into the amino group which contain no nitrogenous group as substituent in the nucleus which is free of carboxyl groups and if desired treating the product with a condensing agent or a substituting agent or with both these agents.

Dependent on the choice of the parent product for obtaining the amino-isothiazolanthrones and on the choice of the compounds which introduce such anthraquinone carboxylic acid radicals which contain no nitrogenous group as substituent in the hetero nucleus there are obtained very various anthraquinoyl-isothiazolanthrones, as, for example, 5-(2'-anthraquinoyl-)-amino-1:9-isothiazole-anthrone, 5-(1'-chloro-2'-anthraquinoyl-)-amino-1:9-isothiazole-anthrone, 4-(1'-amino-2'-anthraquinoyl-)-amino-1:9-isothiazolanthrone, 4-(1'-anthraquinoyl-)-amino-1:9-isothiazole-anthrone and 4:8-(2':2'-dianthraquinoyl-)-diamino-1:9:5:10-di-isothiazole anthraquinone.

In the manufacture of the products of the invention the necessary reactions may occur in the usual manner, for example, in presence of a diluent and solvent, also in presence or absence of an agent which binds acid or catalyst, in an open vessel or under pressure.

The products may be treated with a condensing agent or a substituting agent or both agents, for instance, sulfuric acid, aldehyde, such as formaldehyde or a halogenating agent; further valuable products may thus be obtained. The products may be purified by crystallization or by conversion into their salts with strong acids or by treating with oxidizing agents, for instance, an alkali hypochlorite solution; they may be converted by known methods into leuco-derivatives, for instance, into the leuco sulfuric acid esters.

The products of the invention are in part valuable new intermediate products and in part dyestuffs. They may be used for dyeing and printing vegetable fibres, for instance cotton, or for coloring lacquers and plastic masses and artificial silk. So far as the dyestuffs are soluble in water they may be dyed in the manner of acid dyestuffs for dyeing animal fibres, for instance, wool and silk. The dyeings and printings which they produce are very fast and in part of very strong color.

The following examples illustrate the invention, the parts being by weight:—

Example 1

5 parts of 5-amino-1:9-isothiazole-anthrone in 200 parts of nitrobenzene at 175° C. are mixed with 5.7 parts of anthraquinone-2-carboxylic acid chloride and the mixture is heated at 175° for about half an hour. The mass is filtered at about 50° C. and by washing the solid matter with nitrobenzene and alcohol there is obtained in good yield a bright yellow product of the formula

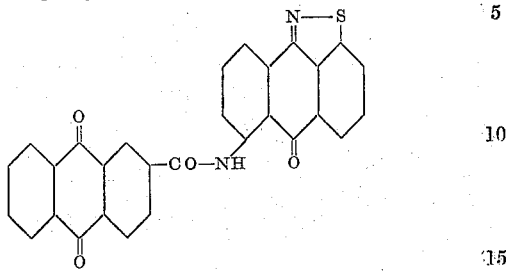

which crystallizes from nitrobenzene and melts at 375° C. It dissolves in concentrated sulfuric acid to a red solution and when vatted yields a clear dark brown solution which dyes cotton very strong and pure yellow tints having good properties of fastness. Instead of 5-amino-1:9-isothiazole-anthrone there may be used 4-, 8- or 6-amino-1:9-isothiazole-anthrone, also 5-amino-8-methoxy- or 5-amino-8-chloro-1:9-isothiazole-anthrone.

By using anthraquinone-1-carboxylic acid chloride instead of anthraquinone-2-carboxylic acid chloride there is obtained a product which is precipitated in crystalline form from the nitrobenzene solution and melts at 385° C.

Example 2

25 parts of 5-amino-1:9-isothiazole-anthrone are mixed in 500 parts of nitrobenzene at 175° C. with 35 parts of 1-chloro-anthraquinone-2-carboxylic acid chloride and the mixture is heated for 1 hour at 175° C. The dyestuff of the formula

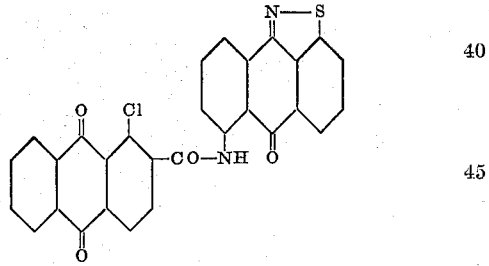

is worked up as described in Example 1. It is a bright yellow powder yielding a brown-vat which dyes cotton tints which are brighter and more greenish than those produced by the dyestuff of Example 1.

Example 3

70 parts of 1-aminoanthraquinone-2-carboxylic acid chloride in 750 parts of nitrobenzene at 100° C. are mixed with 63 parts of 5-amino-1:9-isothiazole-anthrone and the mixture is heated to 180° C.

The dyestuff of the formula

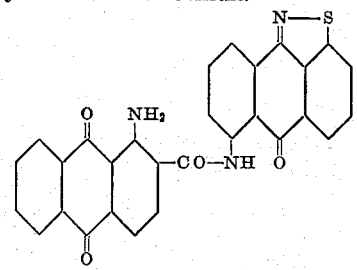

is isolated by a general method. It is a dark red powder which dyes in a red-brown vat red tints on cotton. The product melts at 371° C. It dissolves in concentrated sulfuric acid to a red solution and is changed towards blue by application of paraformaldehyde.

Instead of 1-aminoanthraquinone-2-carboxylic acid chloride there may be used 1-benzoylaminoanthraquinone-2-carboxylic acid chloride, whereby the dyestuff dyeing yellow is obtained.

*Example 4*

29.6 parts of 4:8-diamino-1:9:5:10-diisothiazole-anthraquinone in 1000 part of nitrobenzene at 175° C. are mixed with 58 parts of anthraquinone-2-carboxylic acid chloride and the mixture is heated to boiling. The dyestuff of the formula

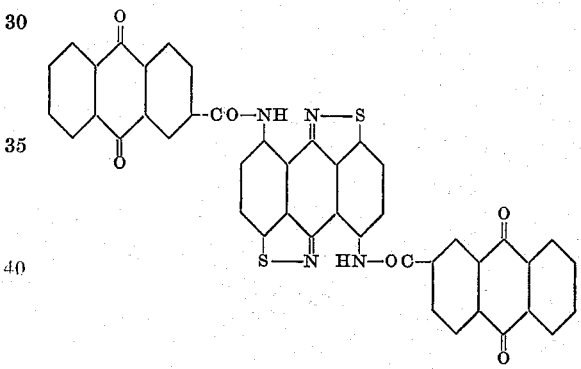

is isolated by a general method. It is a brown-yellow powder which dyes cotton brown-yellow tints in an olive-brown vat.

*Example 5*

7 parts of 1-aminoanthraquinone-2-carboxylic acid chloride and 6.5 parts of 4-amino-1:9-isothiazole-anthrone are heated together in 70 parts of nitrobenzene for 1 hour at 180° C. After cooling and filtering the solid matter is washed with nitrobenzene and alcohol. The product of the formula

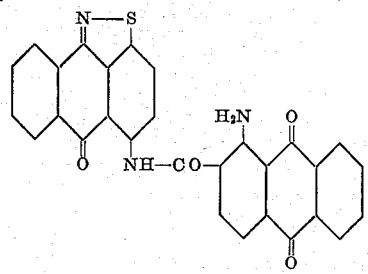

is a red powder which melts at 400° C. and dissolves in concentrated sulfuric acid to a yellow solution.

What we claim is:—

The anthraquinone derivative of the formula

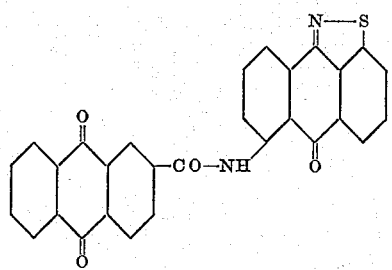

PAUL GROSSMANN.
MAX BOMMER.